(12) United States Patent
Bianchini et al.

(10) Patent No.: US 7,142,672 B2
(45) Date of Patent: Nov. 28, 2006

(54) METHOD AND SYSTEM FOR TRANSMITTING SENSITIVE INFORMATION OVER A NETWORK

(75) Inventors: Paolo Bianchini, Rome (IT); Fabrizio Loppini, Rome (IT)

(73) Assignee: International Business Machines, Armonk, NY (US)

( * ) Notice: Subject to any disclaimer, the term of this patent is extended or adjusted under 35 U.S.C. 154(b) by 898 days.

(21) Appl. No.: 10/171,843

(22) Filed: Jun. 13, 2002

(65) Prior Publication Data

US 2003/0101339 A1   May 29, 2003

(30) Foreign Application Priority Data

Oct. 31, 2001   (GB)   ................... 0126241.9

(51) Int. Cl.
| | |
|---|---|
| H04K 1/10 | (2006.01) |
| H04K 1/00 | (2006.01) |
| G06F 9/00 | (2006.01) |
| G06F 15/16 | (2006.01) |
| G06F 17/00 | (2006.01) |
| G06Q 99/00 | (2006.01) |
| H04L 9/00 | (2006.01) |

(52) U.S. Cl. ............................ 380/33; 726/11; 726/12; 726/13; 726/14; 726/15; 705/64

(58) Field of Classification Search .................... 380/33
See application file for complete search history.

(56) References Cited

U.S. PATENT DOCUMENTS

2002/0035681 A1*   3/2002   Maturana et al. ........... 713/151

* cited by examiner

*Primary Examiner*—Kambiz Zand
*Assistant Examiner*—Benjamin E. Lanier
(74) *Attorney, Agent, or Firm*—The R. Baca Law Firm, PLLC; D'Ann Rifai

(57) ABSTRACT

A method (300) and system for transmitting sensitive information from a client computer to a service provider operating in the INTERNET. The sensitive information (for example a credit card number for carrying out an e-commerce transaction) is split (318) into several chunks, which are meaningless when taken alone. Each chuck is inserted (339) into a corresponding data frame, adding noise information. Information about how to extract each chunk from the corresponding data frame and how to use the chunks to reconstruct the original sensitive information is inserted (336) into a control frame. The data and control frames are distributed (354, 363) to different interface computers of the INTERNET; the frames are then forwarded (366) to the server computer, which is not connected to the INTERNET directly but communicates through a secure private network with the interface computers. The server computer extracts (369–384) the chunks from the data frames and recombines them into the original information according to the content of the control frame.

20 Claims, 4 Drawing Sheets

METHOD AND SYSTEM FOR TRANSMITTING SENSITIVE INFORMATION OVER A NETWORK

FIELD OF INVENTION

The present invention relates to a method and system for transmitting sensitive information over a network.

BACKGROUND OF THE INVENTION

Sensitive information is routinely transmitted over networks of computers exploiting public media, such as the INTERNET. For example, transmission of credit card numbers is commonplace for carrying out electronic commerce (e-commerce) transactions. A major concern relating to this kind of applications is that of avoiding the possibility of someone (such as a hacker) intercepting the sensitive information during transmission.

Typically, the sensitive information is encrypted to ensure a certain level of transmission security. For example, the network employs a protocol known as Secure Sockets Layer (SSL), which is based on a private and public key encryption scheme. In this way, a potential hacker sniffing a communication over the INTERNET will still need to decipher any intercepted block of data, in order to acquire the sensitive information being transmitted.

However, this solution is not completely satisfactory. Particularly, the techniques known in the art do not ensure protection from attacks against a server computer of the network to which the sensitive information has been transmitted; particularly, a hacker may break into the server computer and acquire the sensitive information stored therein.

Moreover, although the encryption schemes commonly used provide a notable level of security, their effectiveness is inherently limited to the extent that the encryption key may be fraudulently acquired, or the encryption scheme may be derived by analysing the intercepted blocks of data.

Finally, none of the solutions known in the art provides a satisfactory protection against attacks intended to overload the server computer with fake incoming traffic.

It is an object of the present invention to overcome the above-mentioned drawbacks. In order to achieve this object, a method as set out in the first claim is proposed.

DISCLOSURE OF THE INVENTION

Briefly, the present invention provides a method of transmitting sensitive information over a network including the steps of: splitting the sensitive information into a plurality of basic elements, generating control information indicative of how to use the basic elements for reconstructing the sensitive information, sending each basic element and the control information from a source computer to at least one corresponding interface computer through an insecure network, forwarding each basic element and the control information from the corresponding at least one interface computer to a target computer through a secure network, and reconstructing the sensitive information in the target computer using the basic elements according to the control information.

The present invention also provides a computer program application for performing the method and a product storing the program application. Moreover, the invention provides a corresponding system for transmitting sensitive information over a network.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENTS

Figure 1:
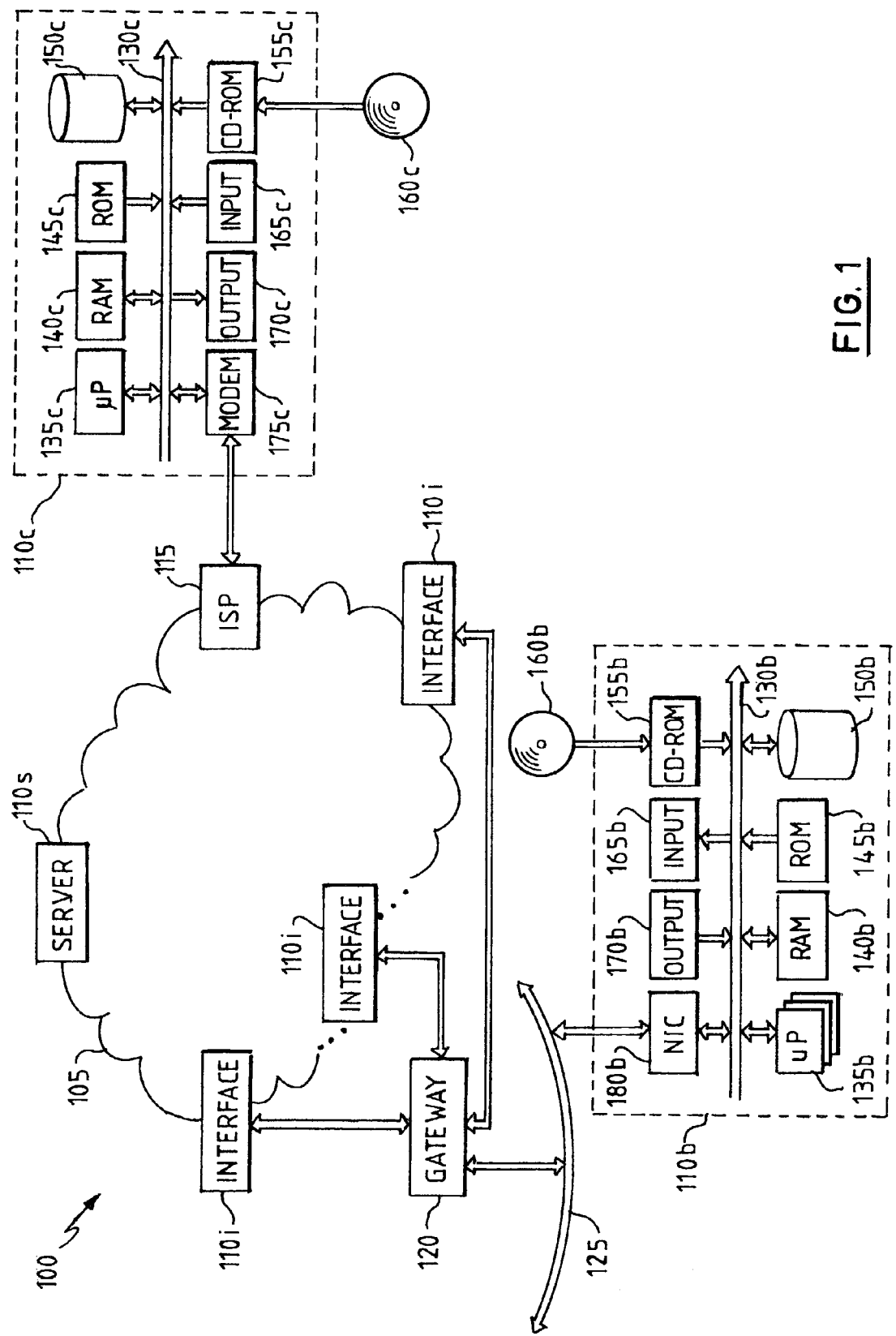
FIG. 1 is a schematic block diagram of a data processing system in which the method of the invention can be used.

With reference in particular to FIG. 1, a data processing system 100 that relies on an insecure network 105, such as the INTERNET, is depicted. Generally speaking, an insecure network consists of a system of computers connected to each other through a telecommunication structure, which allows an uncontrolled access to the network; for example, the network employs public media operated by a common carrier. These kinds of networks are open and unprotected, and then not trusted for their own nature.

Client computers 110c get into the INTERNET 105 through an Internet Access Provider (ISP) 115; access to the INTERNET 105 allows users of the client computers 110c to exploit services offered by server computers 110s of the network. Several geographically distributed interface computers 110i provide multiple access points to the INTERNET 105 for a service provider. Each interface computer 110i is coupled to a gateway computer 120 through a dedicated point-to-point connection. The gateway computer 120 links the INTERNET 105 to a private network 125 of the service provider, such as a Wide Area Network (WAN). The private network 125 includes a back-end server computer 110b, which acts as a target of sensitive information sent from the client computers 110c to the service provider over the INTERNET. The point-to-point connections and the private network 125 use private communication lines belonging to the service provider; moreover, a firewall prevents any unauthorized access to the private network 125 from the INTERNET 105. Therefore, the scheme described above implements a secure network using a trusted telecommunication structure between the interface computers 110i and the back-end computer 110b, which is closed and protected.

Each client computer 110c, for example consisting of a Personal Computer (PC), is formed by several units that are connected in parallel to a communication bus 130c. In detail, a microprocessor (mP) 135c controls operation of the client computer 110c, a RAM 140c is directly used as a working memory by the microprocessor 135c, and a ROM 145c stores basic programs for a bootstrap of the client computer 110c. Several peripheral units are further connected to the bus 130c (by means of respective interfaces). Particularly, a bulk memory consists of a magnetic hard-disk 150c and a driver 155c for reading CD-ROMs 160c. Moreover, the client computer 110c includes input devices 165c (for example consisting of a keyboard and a mouse), and output devices 170c (for example consisting of a monitor and a printer). A MODEM 175c is used to couple the client computer 110c to the INTERNET 105.

The back-end computer 110b (for example consisting of a main-frame) is likewise formed by a bus 130b, multiple microprocessors 135b, a RAM 140b, and a ROM 145b; the back-end computer 110b further includes a hard-disk 150b, a driver 155b for CD-ROMs 160b, input devices 165b and output devices 170b. A Network Interface Card (NIC) 180b is used to plug the back-end computer 110b into the private network 125.

For example, the INTERNET 105 is used to carry out e-commerce transactions. The server computer 110s provides an e-commerce web site that is used by the service provider to advertise and sell different types of goods, such as products (records, books, computers, software programs) or services (car renting, tickets, hotel reservations). A customer accesses the web site of the service provider using the client computer 110c. Payment of the goods selected by the customer is accomplished on-line using a credit card; particularly, the customer sends its credit card number to the back-end computer 110b, which performs all the operations needed to process the payment.

Similar considerations apply if two generic networks with a different level of security are employed (such as a public network and a Virtual Private Network, or VPN), if the client and the back-end computers have a different structure, if the client and the back and computers are coupled to the INTERNET in a different manner, if the e-commerce website is hosted by an interface computer and so on. Alternatively, the system is used for different applications (such as home-banking or electronic funds transfer) which require sensitive information of types (for example passwords, Personal Identification Numbers (PINs) or private addresses) to be transmitted from a generic source computer to a generic target computer.

Figure 2A:
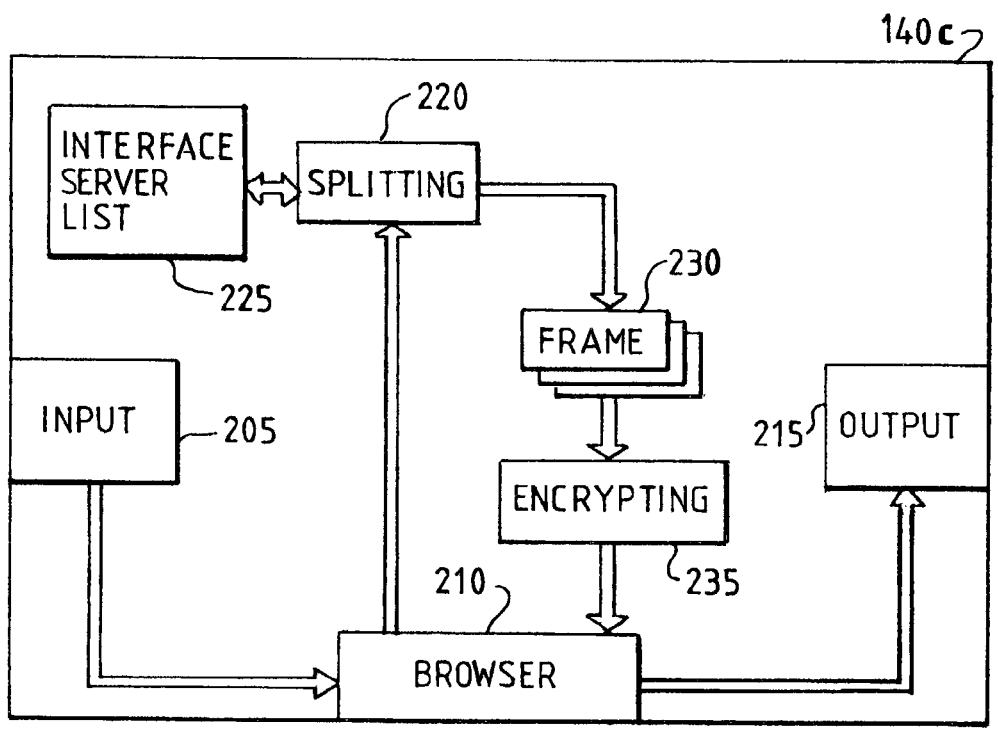
FIG. 2a and FIG. 2b depict a partial content of a working memory of a client computer and of a back-end computer, respectively, of the system.
Figure 2B:
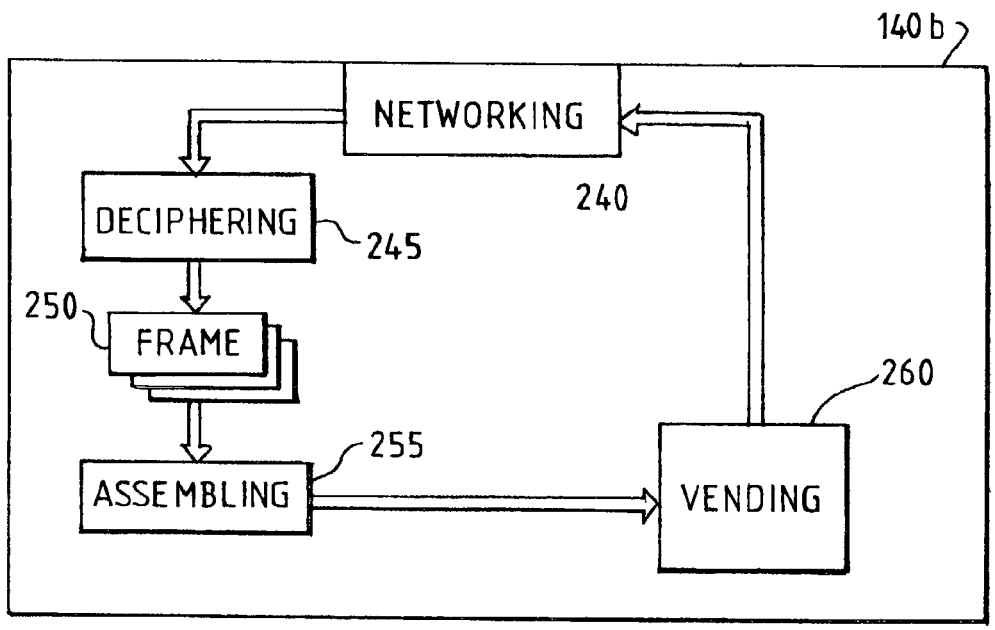

Considering now FIG. 2a and FIG. 2b, a partial content of the working memories 140c and 140b of the client computer and of the back-end computer, respectively, are shown; the information (programs and data) is typically stored on the respective hard-disks and loaded (at least partially) into the working memories when the programs are running, together with an operating system and other application programs (not shown in the figure). The programs are initially installed onto the hard disks from CD-ROMs.

With reference in particular to the client computer, an input interface 205 is used to enter data and/or commands (with the keyboard and the mouse) by the customer. The input interface 205 is coupled to a browser 210, which allows the customer to surf through the INTERNET. The browser 210 directly interfaces with an output buffer 215 for the monitor of the client computer.

A (plug-in) splitting module 220 controls transmission of sensitive information over the INTERNET. The splitting module 220 manages a memory structure 225 storing a list of IP addresses (or equivalent identifiers) of the interface computers associated with the service provider. The splitting module 220 receives the sensitive information from the browser 210 and generates a corresponding set of transmission frames 230; each frame 230 consists of a record formatted according to a pre-set pattern, and it is associated with a control block specifying the IP address of the interface computer to which the frame must be sent. An encrypting module 235 transforms the frames into an apparently unintelligible form; typically, the module 235 employs an asymmetric encryption scheme, wherein a public key of the service provider is used to encrypt an original message and a private key thereof is used to decipher the encrypted message in order to reveal the original message. The frames so encrypted (together with their control blocks) are supplied to the browser 210, in order to be transmitted over the INTERNET.

Moving now to the back-end computer (FIG. 2b), a networking module 240 processes a set of protocol layers working together for defining communication over the private network of the service provider. The networking module 240 receives the frames, which are supplied to a deciphering module 245; the module 245 deciphers the frames using the private key of the service provider, and stores them into a temporary table 250. An assembling module 255 accesses the table 250, and then reconstructs the original sensitive information. The sensitive information so reconstructed is input to a vending module 260, which completes the corresponding transaction and provides a response message to the networking module 240 (for sending back to the client computer).

The frames are used to fragment the sensitive information; particularly, the sensitive information is split into N (with $N^3 2$) basic elements, or chunks, which are meaningless when taken alone. Each chunk, with the addition of masking noise, is then inserted into a corresponding (data) frame. A further (control) frame includes instructions about how to extract each chunk from the corresponding data frame and how to compose the chunks for reconstructing the sensitive information. More specifically, each (data or control) frame has the following format:

| Trans_id | Frame_id | Chunk_no | Chunk_length | Chunk_1 | ... | Chunk_N |
|----------|----------|----------|--------------|---------|-----|---------|
| 4 bytes  | 1 byte   | 1 byte   | 4 bytes      | L bytes | ... | L bytes |

The field Trans_id is a unique identifier of a current transaction; the transaction identifier is identical for all the frames associated with the same sensitive information.

The field Frame_id is a number ranging from 0 to 255, which is used to identify the frame. Particularly, the field Frame_id of the control frame is set to the rest of the ratio between the transaction identifier and the maximum value that is possible for the field Frame_id plus one, that is:

$$Frame\_id = Trans\_id \bmod 256$$

Conversely, the field Frame_id of each data frame is a unique random value (different from the field Frame_id of the control frame).

The frame includes N fields Chunk_i (with i=1 ... N); the field Chunk_no identifies their number and the field Chunk_length specifies the length in bytes (L) of each field Chunk_i. The fields Chunk_i of each data frame consist of a masked block of information, which is generated by overriding the sensitive information with noise except for the corresponding chunk; in other words, each field Chunk_i of the k-th data frame (with k=1 ... N) will be equal to the k-th chuck of the sensitive information when i=k and will be set to a random value otherwise. On the other hand, the first byte of the i-th field Chunk_i of the control frame is equal to the field Frame_id of the data frame including the i-th (unmasked) chuck; in this way, the fields Chunk i of the control frame provide a list of the data frames ordered according to the position of the corresponding unmasked chunk in the sensitive information.

For example, we take into consideration the case in which a credit card number is to be sent over the INTERNET. A credit card number consists of 16 numbers ranging from 0 to 9, such as:

| 1234 5678 8765 4321 |
|---|

The credit card number is split into N=8 chunks, each one formed by two digits (1 byte). If the transaction identifier is 3698, the field Frame_id of the control frame will be equal to:

Frame_id=3698 mod 256=114

Assuming that the fields Frame_id that have been randomly generated for each data frame (from the first one to the eight one) are:

| 120 | 188 | 168 | 66 | 12 | 170 | 202 | 78 |
|---|---|---|---|---|---|---|---| the fields Chunk_i of the control frame are obtained simply adding a random value (denoted with X) to each number, that is:

| 120X | 188X | 168X | 66X | 12X | 170X | 202X | 78X |
|---|---|---|---|---|---|---|---|

The content of the (data and control) frames so generated from the given credit card number are summarised in the following table (with the frames ordered according to their field Frame_id):

(data and control) frames have a different format or they are replaced by equivalent structures.

Figure 3A:
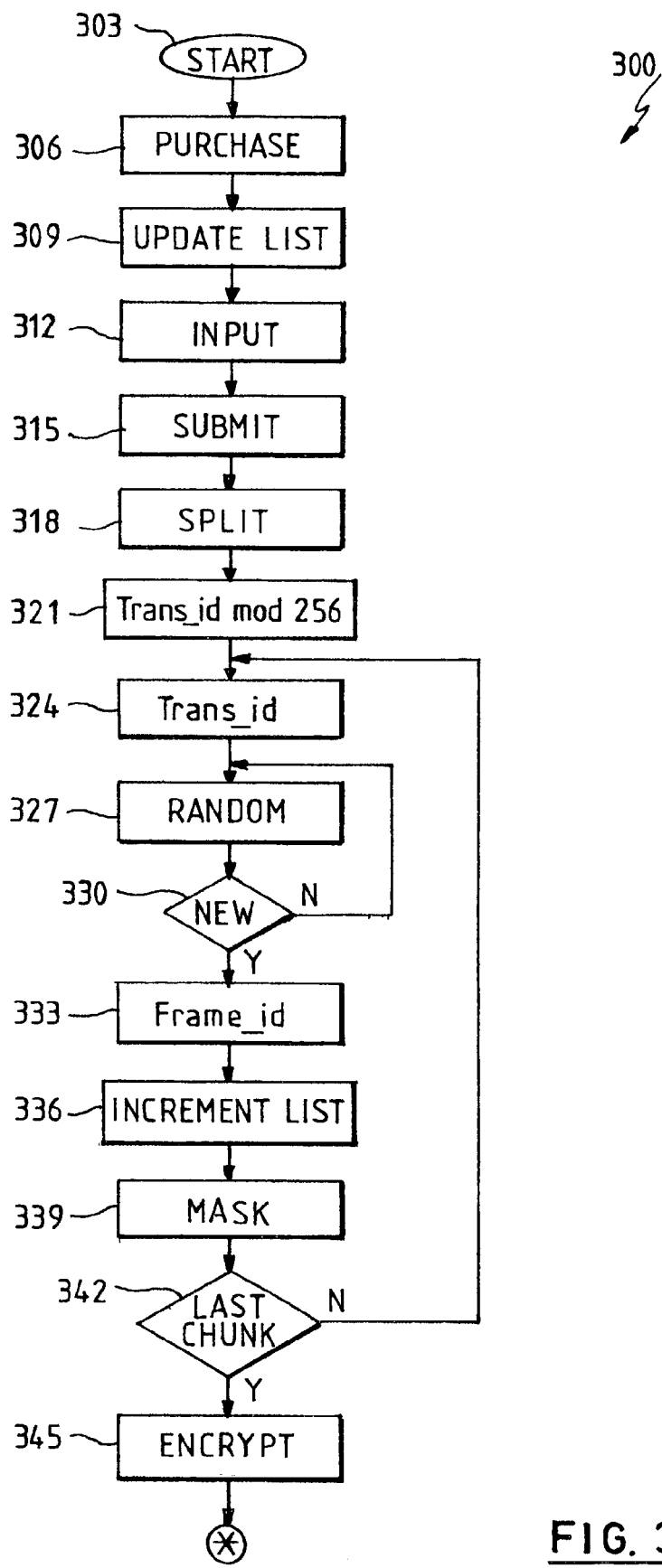
FIGS. 3a–3b show a flow chart describing the logic of a method used for transmitting sensitive information from the client computer to the back-end computer.
Figure 3B:
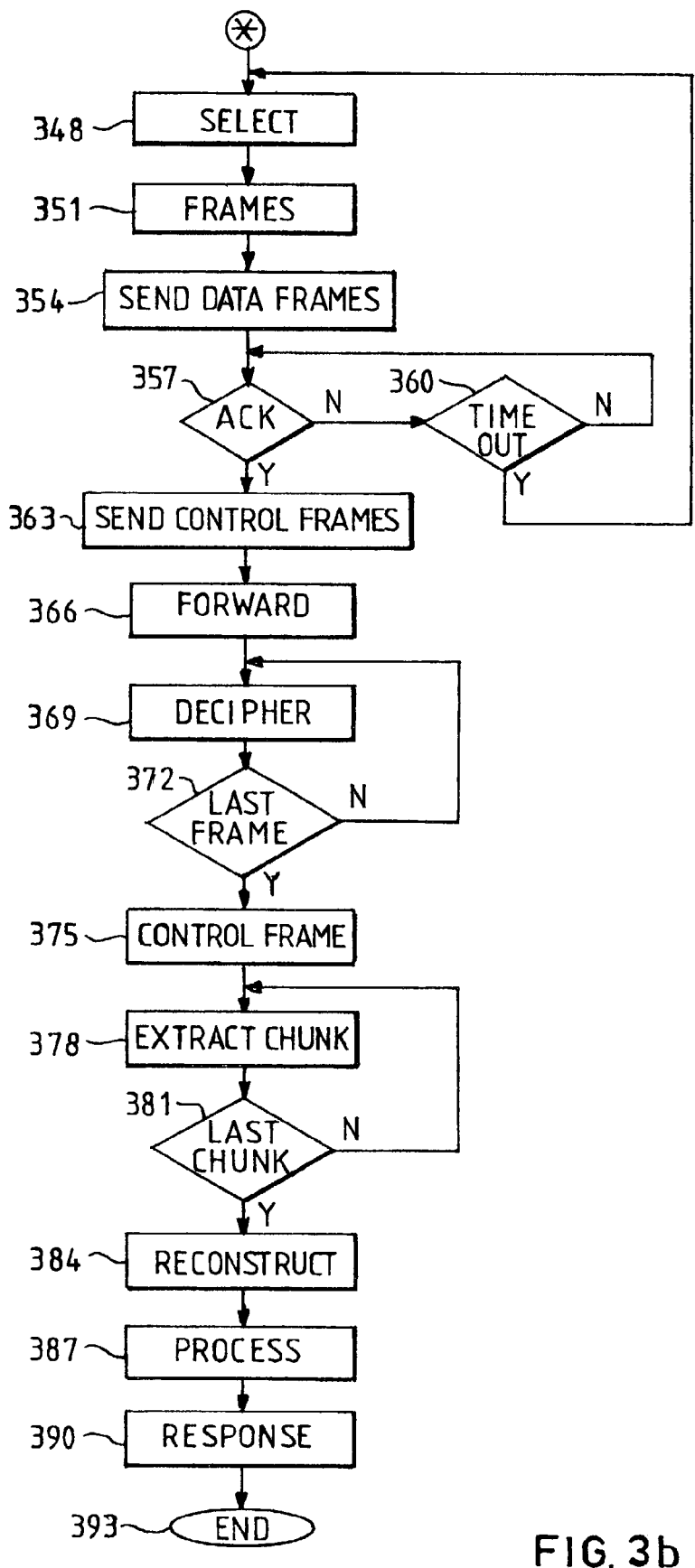

Considering now FIG. 3 whenever sensitive information needs to be transmitted from the client computer to the service provider a series of routines, which together make up a method 300, are performed at successive stages in time. The method starts at block 303 and then passes to block 306, wherein the customer accesses the web site of the service provider by connecting to its server computer. The customer exploits an electronic shopping cart to select goods, review what he/she has selected, and make modifications or deletions. As soon as the customer confirms purchasing of the selected goods, the server computer sends a web page to the client computer, which web page includes a corresponding transaction identifier and an up-to-date list of the interface computers of the service provider. The list of interface computers stored on the client computer is updated at block 309 accordingly. Continuing to block 312, the webpage is displayed on the monitor of the client computer; the web page prompts the customer to input a credit card number (together with other sensitive information, such as its expiration date). After entering the required sensitive information, the customer submits a command at block 315 (for example clicking on a respective hot-spot of the web page, which causes the sensitive information to be sent to the service provider.

Proceeding to block 318, the sensitive information is split into a pre-set number N of chunks. The method continues to block 321, wherein the field Frame_id of the control frame is calculated from the transaction identifier. The transaction identifier is then inserted into the field Trans_id of a current data frame at block 324 (starting from the first one). Descending into block 327, a random value ranging from 0 to 255 is generated. The method checks at block 330 whether this random value is different from the field Frame_id of either the control frame or a preceding data frame. If not, the method returns to block 327 for generating a new random value. Conversely, the random value is inserted into the field Frame_id of the data frame at block 333. Moving to block 336, the same value (with the addition of a random number)

| Credit card number | | | | 12 | 34 | 56 | 78 | 87 | 65 | 43 | 21 |
|---|---|---|---|---|---|---|---|---|---|---|---|
| Trans id | Frame id | Chunk no | Chunk length | Chunk 1 | Chunk 2 | Chunk 3 | Chunk 4 | Chunk 5 | Chunk 6 | Chunk 7 | Chunk 8 |
| 3698 | 12  | 8 | 1 | XX  | XX  | XX  | XX | 87 | XX | XX  | XX |
| 3698 | 66  | 8 | 1 | XX  | XX  | XX  | 78 | XX | XX | XX  | XX |
| 3698 | 78  | 8 | 1 | XX  | XX  | XX  | XX | XX | XX | XX  | 21 |
| 3698 | 114 | 8 | 1 | 120 | 188 | 168 | 66 | 12 | 170| 202 | 78 |
| 3698 | 120 | 8 | 1 | 12  | XX  | XX  | XX | XX | XX | XX  | XX |
| 3698 | 168 | 8 | 1 | XX  | XX  | 56  | XX | XX | XX | XX  | XX |
| 3698 | 170 | 8 | 1 | XX  | XX  | XX  | XX | XX | 65 | XX  | XX |
| 3698 | 188 | 8 | 1 | XX  | 34  | XX  | XX | XX | XX | XX  | XX |
| 3698 | 202 | 8 | 1 | XX  | XX  | XX  | XX | XX | XX | 43  | XX |

Similar considerations apply if a whole application (programs on the client and back-end computers) and the corresponding data are structured in a different manner, if different modules or functions are provided, if the sensitive information is split into a different number of chunks with a different length, and so on. Alternatively, the list of interface computers is stored elsewhere (such as in the ISP), the control frame is replaced by equivalent information, the is also inserted into the first field Chunk_1 of the control frame. With reference now to block 339, the first chuck of the sensitive information is inserted into the field Chunk_1 of the data frame, and random values are inserted into the other fields Chunk_j (with j=2 . . . N). The method checks at block 342 whether a last chunk of the sensitive information has been processed. If not, the method returns to block 324 for generating a next data frame and for incrementing the list inserted into the control frame accordingly.

On the contrary, the (data and control) frames are encrypted at block 345 (using the public key of the service provider). With reference now to block 348, one or more interface computers for each frame are randomly selected from the list of the available ones associated with the service provider. Moving to block 351, a series of transmission structures are generated by composing a control block including the IP address of each selected interface computer with a copy of the corresponding frame. The method then proceeds to block 354, wherein the structures including the data frames are sent over the INTERNET, in order to reach the corresponding interface computers. The method verifies at block 357 whether at least one acknowledgement message has been received for every data frame (that is, whether all the data frames have been successfully delivered to at least one of the corresponding interface computers). If so, the method descends into block 363 (described in the following). Conversely, a test is made at block 360 to ascertain whether a time-out condition has been entered. If a pre-set period (for example 20 s) has not lapsed, the method returns to block 357 in an idle loop. On the contrary, if one or more of the data frames are still undelivered at the expiration of the pre-set period, the method returns to block 348 for resending the undelivered data frames to further interface computers. With reference now to block 363, as soon as all the data frames have been successfully delivered the structures including the control frame are sent over the INTERNET.

Proceeding to block 366, each interface computer directly forwards the received (data or control) frame to the back-end computer (over the private network of the service provider). Each frame is deciphered at block 369 by the back-end computer, and then it is stored into a respective row of the corresponding temporary table (overriding a possible frame with the same field Frame_id already received, when each frame is sent to more than one interface computer). The method checks at block 372 whether all the (data and control) frames have been received; the total number of frames to be received is calculated by adding 1 to the content of the field Chunk_no of any frame. If not, the method returns to block 369 waiting for a next frame.

On the contrary, the control frame is identified from the value of its field Frame_id at block 375. Moving to block 378, the first data frame is identified according to the first chunk of the control frame, and the respective (unmasked) chunk is extracted (field Chunk_1). The method checks at block 381 whether a last chuck has been revealed. If not, the method returns to block 378 for processing a next data frame. Conversely, the chunks so extracted are combined to reconstruct the original sensitive information at block 384. The method passes to block 387, wherein the back-end computer completes the transaction using the received sensitive information. Proceeding to block 390, a corresponding response message is sent back to the client computer. The method then ends at the final block 393.

Similar considerations apply if the application performs an equivalent method, for example with error routines, if the threshold period for the time-out is set to a different value, if the sensitive information is reconstructed in a different manner, and the like. Alternatively, the number of chunks is calculated dynamically (for example according to the number of bytes of the sensitive information or according to the number of interface computers of the service provider), or the data frames are stored into the interface computers and collected by the back-end computer after receiving the control frame.

More generally, the present invention provides a method of transmitting sensitive information over a network. The sensitive information is split into a plurality of basic elements; control information indicative of how to use the basic elements for reconstructing the sensitive information is generated. Each basic element and the control information are sent from a source computer to one or more corresponding interface computers through an insecure network. Each basic element and the control information are then forwarded from the corresponding interface computers to a target computer through a secure network. The sensitive information is reconstructed in the target computer using the basic elements according to the control information.

The proposed solution increases the security level of any transmission of sensitive information. Particularly, the sensitive information is only reconstructed in the target computer that is not connected to the insecure network directly.

Conversely, each piece of information transmitted over the insecure network is only a part of the whole sensitive information. Therefore, even if a single piece of information is intercepted and deciphered, it is meaningless when taken alone. Therefore, the sensitive information is also protected from any attack against each one of the interface computers connected to the insecure network directly.

Moreover, distribution of the sensitive information among multiple interface computers makes sniffing by a possible hacker very difficult. Interception of the sensitive information is made still harder by the fact that any piece of information is sent over the insecure network independently (for example, through different physical paths).

The method of the invention also protects the target computer against attacks intended to overload the same; in fact, any fake incoming traffic may be intercepted by disabling the interface computer to which the traffic has been directed, without affecting operation of the other interface computers and of the target computer.

The proposed solution is particularly advantageous for big service providers, which can benefit from the availability of a wide area private network with distributed INTERNET access points (even if exploitation by different organisations is not excluded).

The preferred embodiment of the invention described above offers further advantages.

Particularly, a masked block of information is generated for each chunk; the masked blocks of information and the control information are then inserted into corresponding transmission structures for sending through the insecure and the secure networks.

In this way, the original sensitive information is further confused with noise; an additional level of security is then assured by the complexity of the reconstruction process for extracting and assembling the original sensitive information from the different masked blocks of information.

Advantageously, each frame includes a frame identifier that is randomly generated for the data frames; a list of frame identifiers needed to order the data frames correctly is inserted into the control information.

This feature ensures that no indication of the position of the chunk embedded into each data frame may be inferred from the data frame.

However, the solution according to the present invention leads itself to be carried out without adding any noise to the data frames, or even identifying each data frame with a corresponding progressive number.

Moreover, the control frame is defined by a frame identifier having a value that is calculated from a common transaction identifier according to a pre-set formula.

The devised characteristic ensures that the frame identifier of the control frame is not a static value, but it changes dynamically from one transaction to the other.

Preferably, the frame identifier of the control frame is calculated as the rest of a division.

This formula is particular simple, but at the same time effective.

Alternatively, the frame identifier of the control frame is calculated with a different formula, or the control frame is defined in a different manner, even with a fixed value of the frame identifier.

In a particular embodiment of the present invention, the frames are sent to interface computers that are randomly selected.

This feature makes it further difficult for a hacker to intercept the frames sent over the insecure network.

Preferably, the same frame is sent to two or more interface computers.

In this way, any problem given by a temporarily unavailability of certain interface computers may be avoided (without affecting the transmission security).

Moreover, the control information is transmitted only after all the chunks have been received by at least one corresponding interface computer.

In this way, a frame may be resent immediately to a different interface computer when it has not been successfully delivered.

However, the solution of the invention is also suitable to be implemented selecting the interface computers in a different manner, distributing the chunks to a pre-set system of interface computers, sending each chunk only to a single interface computer, or even transmitting the data frames and the control frame at the same time.

Advantageously, the method according to the present invention is implemented with a computer program application (consisting of a series of programs installed on different computers of the system), which is provided on CD-ROM.

Alternatively, the programs are provided on floppy-disks, are pre-loaded onto the hard-disks, or are stored on any other computer readable medium, are sent to the computers through the INTERNET, are broadcast, or more generally are provided in any other form directly loadable into a working memory of the computers. However, the method according to the present invention leads itself to be carried out even with a hardware structure, for example integrated in multiple chips of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A method of transmitting sensitive information over a network including the steps of:

splitting sensitive information into a plurality of basic elements;

generating control information indicative of how to use the basic elements for reconstructing the sensitive information;

sending each basic element and the control information from a source computer to at least one corresponding interface computer through an insecure network, forwarding each basic element and the control information from the corresponding at least one interface computer to a target computer through a secure network, and reconstructing the sensitive information in the target computer using the basic elements according to the control information;

generating a masked block of information for a basic element of the plurality of basic elements, wherein the step of generating a masked block includes the step of assigning the basic element to a position within a corresponding data frame;

inserting noise into the data frame except for the basic element, the noise inserted according to a predetermined algorithm; and inserting the masked block of information and the control information into a corresponding transmission structure for sending the corresponding transmission structure through the insecure network and the secure network, the control information being further indicative of how to extract the basic element from the corresponding masked block of information.

2. The method according to claim 1, further including the steps of:

generating a masked block of information for each basic element by masking the sensitive information with noise except for each basic element, the control information being further indicative of how to extract each basic element from the corresponding masked block of information, and inserting each masked block of information and the control information into a corresponding transmission structure for sending through the insecure network and the secure network.

3. The method according to claim 2, wherein each transmission structure includes a frame identifier, the method further including the steps of:

randomly generating frame identifiers for each masked block of information, and inserting an indication of a list of the frame identifiers associated with the masked blocks of information into the control information, the list ordering the transmission structures associated with the masked blocks of information according to a position of the corresponding unmasked basic elements in the sensitive information.

4. The method according to claim 3, wherein each transmission structure includes an identical transaction identifier, the method further including the step of calculating a frame identifier associated with the control information from a transaction identifier according to a pre-set formula.

5. The method according to claim 4, wherein the step of calculating a frame identifier associated with the control information includes setting the frame identifier associated with the control information based on a ratio between the transaction identifier and a maximum value possible for the frame identifier plus one.

6. The method according to claim 1, further including the step of randomly selecting the at least one interface computer corresponding to each basic element and to the control information from a set of available interface computers.

7. The method according to claim 1, wherein the at least one interface computer corresponding to each basic element and to the control information consists of a plurality of interface computers.

8. The method according to claim 1, further including the step of returning an acknowledgement message from the at least one interface computer to the source computer for confirming receipt of the corresponding basic element, the control information being sent from the source computer to the at least one corresponding interface computer in response to at least one acknowledgement message for all the basic elements.

9. A computer program application embodied in a computer readable medium directly loadable into a working memory of data processing system for performing a method of transmitting sensitive information over a network when the program application is run on the data processing system, the method including the steps of:
- splitting the sensitive information into a plurality of basics elements,
- generating control information indicative of how to use the basic elements for reconstructing the sensitive information,
- sending each basic element and the control information from a source computer to at least one corresponding interface computer through an insecure network,
- forwarding each basic element and the control information from the corresponding at least one interface computer to a target computer through a secure network, and
- reconstructing the sensitive information in the target computer using the basic elements according to the control information;
- generating a masked block of information for a basic element of plurality of basic elements, wherein the step of generating a masked block includes the step of assigning the basic element to position within a corresponding data frame;
- inserting noise into the data frame except for the basic element, the noise inserted according to a predetermined algorithm; and
- inserting the masked block of information and the control information into a corresponding transmission structure for sending the corresponding transmission structure through the insecure network and the secure network, the control information being further indicative of how to extract the basic element from the corresponding masked block of information.

10. A data processing system for transmitting sensitive information over a network including means for splitting the sensitive information into a plurality of basic elements comprising: means for generating control information indicative of how to use the basic elements for reconstructing the sensitive information, means for sending each basic element and the control information from a source computer to a at least one corresponding interface computer through an insecure network, means for forwarding each basic element and the control information from the corresponding at least one interface computer to a target computer through a secure network, and means for reconstructing the sensitive information in the target computer using the basic elements according to the control information;
- generating a masked block of information for a basic element of the plurality of basic elements, wherein the step of generating a masked block includes the step of assigning the basic element to a position within a corresponding data frame;
- inserting noise into the data frame except for the basic element, the noise inserted according to a predetermined algorithm; and
- inserting the masked block of information and the control information into a corresponding transmission structure for sending the corresponding transmission structure through the insecure network and the secure network, the control information being further indicative of how to extract the basic element from the corresponding masked block of information.

11. A data processing system for transmitting sensitive information over a network comprising: a software module for splitting the sensitive information into a plurality of basic elements and for generating control information indicative of how to use the basic elements for reconstructing the sensitive information, a software module for sending each basic element and the control information from a source computer to at least one corresponding interface computer through an insecure network, a software module for forwarding each basic element and the control information from the corresponding at least one interface computer to a target computer through a secure network, and a software module for reconstructing the sensitive information in the target computer using the basic elements according to the control information;
- generating a masked block of information for a basic element of the plurality of basic elements, wherein the step of generating a masked block includes the step of assigning the basic element to a position within a corresponding data frame;
- inserting noise into the data frame except for the basic element, the noise inserted according to a predetermined algorithm; and
- inserting the masked block of information and the control information into a corresponding transmission structure for sending the corresponding transmission structure through the insecure network and the secure network, the control information being further indicative of how to extract the basic element from the corresponding masked block of information.

12. The method according to claim 1 further comprising the step of encrypting the plurality of basic elements prior to the step of sending each basic element of the plurality of basic elements through the insecure network to the target computer.

13. The method according to claim 1 wherein the step of reconstructing the sensitive information in the target computer includes the step of decrypting each basic element by the target computer.

14. The method according to claim 8, further including the step of resending the corresponding basic element to another interface computer in response to the source computer not receiving the acknowledgement message from the at least one corresponding interface computer.

15. The method according to claim 1 wherein the step of inserting noise within the data frame except for the basic element includes the step of operating the predetermined algorithm based on the position of the basic element within the corresponding data frame.

16. A method of transmitting sensitive information over multiple computer networks including the steps of:
- splitting sensitive information into a plurality of basic elements;
- encrypting the plurality of basic elements;
- generating control information indicative of how to use the plurality of basic elements for reconstructing the sensitive information;
- sending the plurality of basic elements, in encrypted form, and the control information, through an insecure network from a source computer to a plurality of interface computers disposed within the insecure network;
- forwarding the plurality of basic elements and the corresponding control information from the plurality of interface computers in the insecure network through a secure network to a target computer disposed within the secure network; and reconstructing the sensitive information in the target computer using the plurality of basic elements according to the control information;

generating a masked block of information for a basic element of the plurality of basic elements, wherein the step of generating a masked block includes the step of assigning the basic element to a position within a corresponding data frame;

inserting noise into the data frame except for the basic element, the noise inserted according to a predetermined algorithm; and inserting the masked block of information and the control information into a corresponding transmission structure for sending the corresponding transmission structure through the insecure network and the secure network, the control information being further indicative of how to extract the basic element from the corresponding masked block of information.

17. The method according to claim 2, wherein each transmission structure includes a frame identifier, the method further including the steps of:

generating the frame identifier of each data fame associated with each masked block of information, and inserting an indication of a list of the data frame identifiers associated with the masked blocks of information into the control information, the list ordering the transmission structures associated with the masked blocks of information according to a position of the corresponding unmasked basic elements in the sensitive information.

18. The method according to claim 17, wherein each transmission structure includes an identical transaction identifier, the method further including the step of calculating a frame identifier associated with the control information from a transaction identifier according to a pre-set formula.

19. The method according to claim 18, wherein the step of calculating a frame identifier associated with the control information includes setting the frame identifier associated with the control information based on a ratio between the transaction identifier and a maximum value possible for the frame identifier plus one.

20. The method according to claim 1, further including the step of selecting the at least one interface computer corresponding to each basic element and to the control information from a set of available interface computers.

* * * * *